Figure 1:
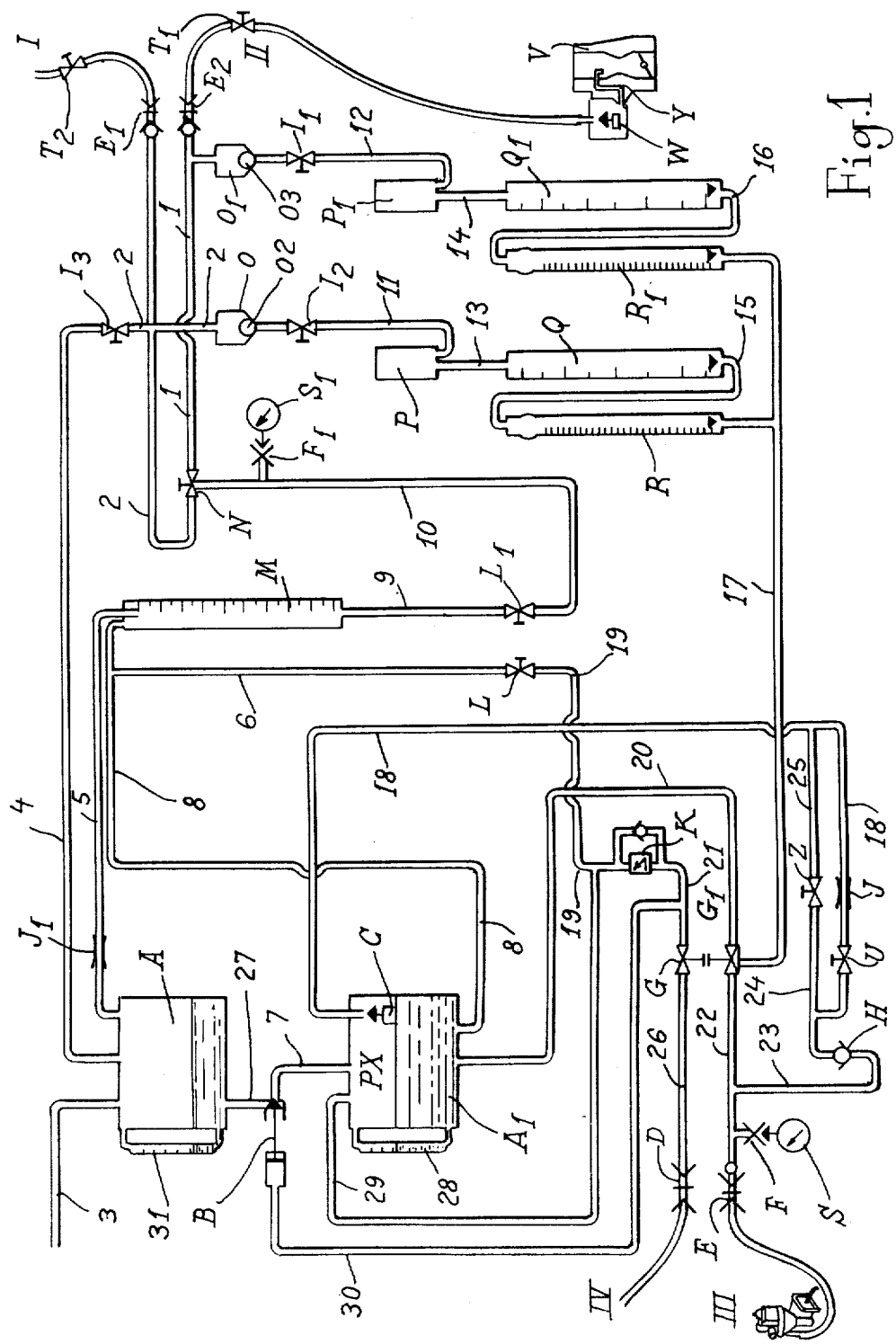

United States Patent [19]
Monnet

[11] 3,935,732
[45] Feb. 3, 1976

[54] PROCESS AND APPARATUS FOR THE MEASUREMENT OF VOLUME, FLOW RATE AND CONSUMPTION, AT A PREDETERMINABLE PRESSURE, OF COMBUSTIBLE LIQUID BY AN APPARATUS IN PLACE AND FUNCTIONING

[75] Inventor: Francois Monnet, Nice, France
[73] Assignee: S.A.R.L. Sud est Electro Mecanique S.E.E.M., Nice, France
[22] Filed: July 19, 1974
[21] Appl. No.: 490,126

[52] U.S. Cl. .................................................. 73/118
[51] Int. Cl.² ........................................ G01M 15/00
[58] Field of Search .............. 73/3, 118, 119 R, 168

[56] References Cited
UNITED STATES PATENTS
| | | | |
|---|---|---|---|
| 3,156,113 | 11/1964 | Dollar | 73/118 |
| 3,434,341 | 3/1969 | Zaske | 73/118 |

*Primary Examiner*—Harry N. Haroian
*Attorney, Agent, or Firm*—Young & Thompson

[57] ABSTRACT

Apparatus for monitoring and regulating carburetors and other gasoline consumption devices comprises a first conduit, means for feeding test liquid under pressure to the first conduit, a flowmeter, an auxiliary reservoir, a first valve in the first conduit for selectively directing the flow of liquid either directly from the source of liquid to the flowmeter or from the auxiliary reservoir to the flowmeter, and a float valve and a check valve for arresting the flow of liquid to the auxiliary reservoir when the auxiliary reservoir is full. A second conduit is provided, for air under pressure, with a pressure regulator in the second conduit, a second valve in the second conduit coupled to the first valve and so arranged that the second valve is open when the first valve is in the position in which the flow meter is fed from the auxiliary reservoir and is closed when the first valve is in a position that the flowmeter is fed directly from the source of fluid under pressure. The second conduit supplies air under pressure to the auxiliary reservoir, and a vertical graduated gauge is provided, whose lower part is in fluid communication with a carburetor to be tested and whose upper part is connected to the lower part of the auxiliary reservoir and to the pressure regulator. A third valve is provided between the upper end of the gauge and the pressure regulator whereby when the third valve is open, air under pressure forces liquid in the gauge toward the bottom of the gauge and when the third valve is closed, liquid under pressure can flow into the gauge. A calibrated overflow conduit for said gauge maintains the gauge under pressure.

6 Claims, 2 Drawing Figures

PROCESS AND APPARATUS FOR THE MEASUREMENT OF VOLUME, FLOW RATE AND CONSUMPTION, AT A PREDETERMINABLE PRESSURE, OF COMBUSTIBLE LIQUID BY AN APPARATUS IN PLACE AND FUNCTIONING

The present invention has for its object the measurement of volume, flow rate and consumption, at a predeterminable pressure in an apparatus in place and functioning, for example a heater for combustible liquid or an automotive carburetor.

At present, the control and measurement of the functioning of a pump or carburetor is achieved by removing the device to be tested, and then testing it on apparatus more or less complicated and precise, or by replacing it with another new device which permits, by comparison, determining what is the origin of the difficulty or what is the defective part.

All these operations therefore require a great amount of labor to measure, control and regulate a carburetor or a feed pump, which of course is costly.

The apparatus according to the present invention permits avoiding all these difficulties, the amount of labor being considerably diminished to measure, with great precision, all the principal characteristics of a feed pump or carburetor and, by the use of these measurements, to facilitate the regulation of the motor.

The apparatus of the present invention thus permits, without removing the device from the motor and without a great deal of labor, to effect measurement of the pressure of the feed pump, to determine whether the feed pump valve is leaking, whether the pump pressure varies during simulated consumption tests, whether the needle valve of the carburetor leaks and, in that case, to measure the volume of that leak, to verify the consumption of the pump for a certain number of cycles of operation, to measure the level of the vacuum as an indication of the action of the needle valve on the cutoff of carburetor feed, the consumption of the different jets and the simultaneous consumption of plural carburetors according to the revolutions of the motor.

The apparatus of the present invention, mounted between the feed pump and the carburetors, permits making all of these measurements.

To this end, the feed pump feeds on the one hand the carburetors, through flowmeters for measuring consumption, and on the other hand an auxiliary reservoir. This auxiliary reservoir may be under predetermined pressure to feed the carburetors, either by a circuit passing via a gauge to measure liquid volume, this gauge having an automatic zero return device for the liquid, or by another circuit passing through flowmeters. Two manometers are branched in parallel, one having an inlet from the carburetor indicating the pump pressure, the other an outlet from the carburetor indicating the pressure of the liquid employed. Finally, a return reservoir, in relation to the auxiliary reservoir, permits recovering the liquid employed in the consumption tests, and also the liquid from the automatic zero return of the gauge.

Figure 2:
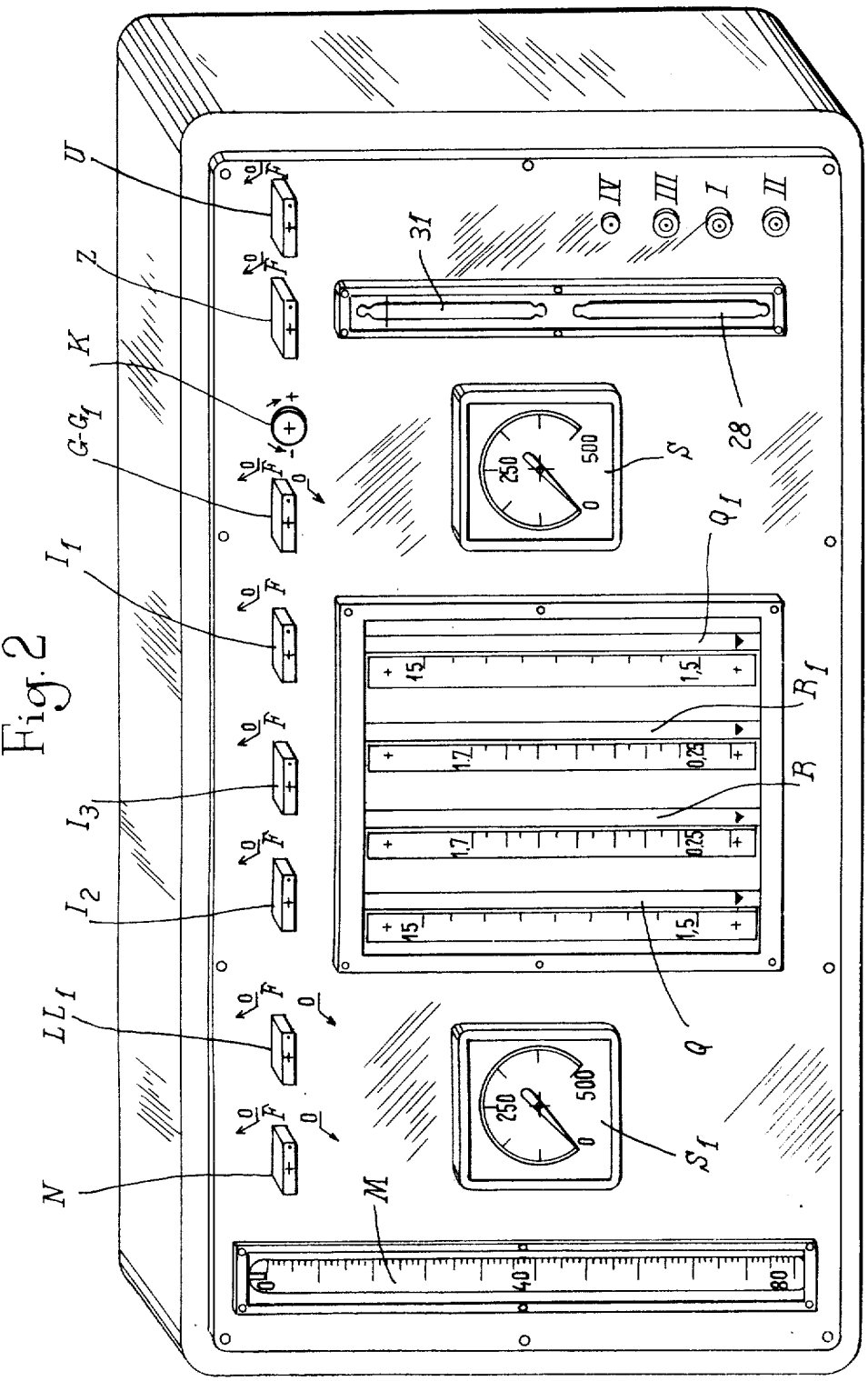

Other objects, features and advantages of the present invention will become apparent from a consideration of the following description, taken in connection with the accompanying drawings, in which:

FIG. 1 is a schematic diagram showing the various parts of apparatus according to the invention, their flow connections, the arrangement of the valves, the restricters, the nozzles, the gauges, the flowmeters, the air valve, the air lock, the manometers and the pressure reducers; and FIG. 2 shows the control panel for effecting the various measurements.

To facilitate the description of the apparatus, a certain order has been given to the different measurements. It will be understood, however, that all these measurements may be effectuated in a different order; although it is preferable to group the measurements with regard to the dynamic tests and with regard to the static tests. Parallel to the feed circuit of the pump, a feed circuit may be branched for a reserve liquid which is itself at the pressure of the feed pump, that is, a theoretical pressure set by the manufacturer or according to the desired pressure.

The feed pump at the lower left of FIG. 1 is connected to the conduit III, and a coupling with automatic closure is shown at E. A valve F in a lateral conduit leads to manometer S which accordingly measures the pump pressure.

Air at high pressure is fed in through conduit IV, from a source of air under pressure (not shown) and a quick-disconnect coupling D is disposed in this line, which becomes conduit 26. A valve G controls the flow of air to conduits 21 and 30. Valve G is coupled to valve $G_1$ in conduit 22 in the following manner: if the valve G is open, the valve $G_1$ is also open to establish communication between conduits 17 and 20; while if the valve G is closed, then valve $G_1$ is in position to establish communication between conduits 22 and 17.

When valve G is open, air under high pressure enters conduits 21 and 30. In conduit 30, a pneumo valve B is arranged in such a manner as to interrupt communication between the discharge reservoir A and, below this reservoir, the auxiliary reservoir $A_1$, through conduits 27 and 7. These two reservoirs are accordingly isolated from each other when valve G is open. Discharge reservoir A has a liquid level indicator 31 and auxiliary reservoir $A_1$ has a liquid level indicator 28. In conduit 21, a pressure reducer K with a one-way valve permits regulating the pressure to obtain the operational pressure desired for the liquid. Downstream of reducer K, the conduit branches into two conduits 19 and 29. Conduit 29 empties into the upper part of auxiliary reservoir $A_1$; while in conduit 19, a control valve L is disposed for automatic zero setting of the graduated gauge M. Valve L is ordinarily open.

The feed conduit for liquid III branches, after valve F, in two conduits 22 and 23. Conduit 23 feeds liquid to the auxiliary reservoir $A_1$, through conduits 18 and 25. A non-return valve H is disposed in conduit 23, valve H having a ball of a density about that of the liquid to be measured, e.g. gasoline. Valve H prevents harm to the pump if, by mistake, there is an excess of pressure in the auxiliary reservoir $A_1$ fed through the conduit 18 which is not closed by the float valve C. Conduit 23, after the return valve H, divides in two conduits 18 and 25, the one for automatic filling, and the other for rapid filling of reservoir $A_1$, conduit 25 having a valve Z permitting rapid filling of auxiliary reservoir $A_1$, while conduit 18 comprises a valve U which permits, if the valve of the feed pump leaks, isolating the automatic filling of the auxiliary reservoir $A_1$. Downstream of valve U is a calibrated filling orifice J for permitting automatic filling. Calibrated orifice J is selected so that the smallest pump of the vehicle may fill the auxiliary reservoir $A_1$, without changing the pump pressure.

Conduit 18 feeds liquid to reservoir $A_1$, and empties into its upper portion; and when $A_1$ is full, float valve C automatically closes conduit 18.

Two carburetors under test are indicated at I and II (FIG. 2). However, for simplicity, in FIG. 1 a single carburetor V is shown. The carburetors are fed with liquid, either by the vehicle feed pump through 22–27 or by the auxiliary reservoir $A_1$, by conduits 20–17, or by feed conduit 10 connected to auxiliary reservoir $A_1$, by conduits 1 and 2.

In conduit 17 fed by liquid, either by the vehicle feed pump when $G_1$ opens the circuit to the conduits 22–17, or by the auxiliary reservoir $A_1$ under pressure when $G_1$ opens the circuit to the conduits 20–17, there are located two flowmeters for measuring small flows, R and $R_1$, and two flowmeters for measuring large flows, Q and $Q_1$, each carburetor being connected to the pairs of flowmeters Q–R and $Q_1$–$R_1$, the flowmeters Q–R and $Q_1$–$R_1$ being connected between themselves by conduits 15 and 16. The flowmeters R–Q and $R_1$–$Q_1$ are connected by conduits 13 and 14 to reservoirs P and $P_1$ which contain an air cushion. These reservoirs P and $P_1$ comprise conduits 11 and 12 in which are disposed valves $I_2$ and $I_1$, and devices O and $O_1$ to dampen sharp variations in the flow of the carburetors. O is connected, by conduit 2, to valve N, valve $I_3$, to the automatic closure coupling $E_1$ disposed in the same conduit, and to valve $T_2$ opening the conduit 2 to the carburetor (not shown) which is at I. Valve $I_3$ opens and connects the conduit 11, when $R_2$ is open, to conduit 4 which empties into the upper part of the discharge reservoir A. $O_1$ is connected, by conduit 1, to the valve N and to valve $T_1$, connected directly to the carburetor V. Conduit 1 comprises, above valve $T_1$, an automatic coupler $E_2$.

Valve N is a three-way valve permitting the placing in communication of conduits 2 and 10 and conduits 1 and 10, the feed conduit 10 being connected to the auxiliary reservoir $A_1$ by conduit 8, gauge M, conduit 9 and valve $L_1$.

Auxiliary reservoir $A_1$ comprises a conduit 8 which empties into the upper part of the graduated gauge M. Conduit 8 a little in advance of its feed to gauge M, is connected to the conduit 6.

Conduit 6 comprises a valve L for automatic zeroing and which connects it to conduit 19 which is connected to pressure reducer K. It will accordingly be understood that at this level, it is possible to use air under pressure for the automatic zeroing of gauge M. Gauge M, in its upper part, just at the level of the zero graduation, comprises a conduit 5, in which is disposed a calibrated orifice $J_1$, which empties into the upper part of the discharge reservoir A, this discharge reservoir A comprising in its upper part another conduit 3 opening to the ambient atmosphere. In the lower part of gauge M, conduit 9 comprises a valve $L_1$ which connects it to the conduit 10 terminating in valve N. Finally, in conduit 10 is disposed a branch conduit containing a valve $F_1$ which controls a manometer $S_1$ for measuring utilization of the liquids.

It should be noted in connection with the above that the feed of the carburetor or carburetors is either directly from the feed pump of the vehicle, along conduits 22–17, or from the auxiliary reservoir $A_1$ under pressure along the conduits 20–17, or through conduits 8, 9 and 10. The description of these different paths of measurement explains the various characteristics of the present invention.

To start up, a source of air under pressure (not shown) is connected at IV, and the feed pump at III. The carburetor or carburetors are connected at I and II. The motor is in operation. Valve Z is open and thus permits a rapid filling of the auxiliary reservoir $A_1$, after which it is closed, the valve C closing the conduit 18 when the reservoir is full. Valve U is open, placing in communication the automatic refill device of the auxiliary reservoir $A_1$.

The following measurements can be performed.

1. Pressure of the Feed Pump

With the motor in operation, the pump feeds the carburetors by the conduits 22–17, the flowmeters R–Q, the conduits 13–11; valve $I_2$ is open, valve $T_2$ is open. The pressure of the feed pump is read on the entry manometer S.

To verify whether the pressure on the manometer S of the feed pump is maintained at maximum designed flow, the valve $I_3$ is progressively opened and the liquid is evacuated by conduit 4 in the discharge reservoir A. One then reads on the flowmeter R–Q, the flow value and simultaneously verifies on S the pump pressure as a function of flow.

2. Leakage of the Feed Pump Valve

The valve $G_1$ opens the circuit of the auxiliary reservoir $A_1$ through conduits 20–17 (G being open). Valve U is closed. The vehicle motor is stopped; and if the feed pump valve is not leaking, then the pressure should remian constant.

3. Leakage Past the Carburetor Needle

The motor is stopped, valve G is open, air at high pressure through conduits 21–30 closes, by means of the pneumo valve B, the passage between the conduits 27 and 7 and through the conduit 21 to the regulable pressure reducer K, to put under pressure $P_r$ on the one hand the auxiliary reservoir $A_1$ through the conduit 29, and on the other hand the conduit 19.

Valves $I_1$ and $I_2$ are closed. Valve $L_1$ is open and one closes the valve L. The liquid then fills gauge M, not by gravity but by the pressure $P_r$, which is a characteristic of the invention, by virtue of the loss of charge of the calibrated orifice $J_1$. The liquid also fills the conduits 9, 10, 1, and the carburetor V. For automatic zero reset of the gauge M, according to another characteristic of the invention, one opens the valve L and the air under pressure $P_r$ evacuates the liquid which is above the zero line of the gauge M. In the conduit 8, the liquid arrives at the same level as the liquid in the auxiliary reservoir $A_1$. One then closes the valve $L_1$. The pressure of the manometer $S_1$ should remain constant if the needle of the carburetor V, placed in communication by the valve N, through conduits 10-1, does not leak.

To determine the value of leakage at needle W, one opens the valve $I_1$ and the value of the leakage can be read directly on the flowmeters.

4. Pump Return

This value can be measured only for one carburetor at a time. The motor is not in operation. The gauge M under pressure is filled as well as the conduits 9, 10 and 1. Carburetor V is full and $T_1$ is open, valve N opening the circuit 10–1. G is open, and $G_1$ opens the circuit 20–17. Valves I, and $I_2$ are closed. Gauge M is automatically at its zero graduation. Valve L is open and valve $L_1$ is closed. In the course of x cycles of the pump (or depressions of the accelerator) according to design standards, one then open s valve $L_1$, the valve L remaining open, and liquid is fed under pressure and not by gravity to the carburetor. Gauge M is emptied of consumed liquid by *x* cycles of the pump and the value of this consumption can be read directly on gauge M.

5. Vacuum Level.

Being careful to fill carburetor V, valve $T_1$ is closed; and it is to avoid false readings that this latter valve is quite close to the carburetor.

The motor is actuated, and then stops itself because it has no feed, $T_1$ being closed. The accelerator is then depressed several times to raise the liquid to the level of the lower channel Y. Gauge M has been automatically returned to zero and is then refilled while closing valve L, the valve $L_1$ being open. Then valve L is opened, which moves the liquid above the zero mark, the valve $L_1$ remaining open and the valve N opens the circuit 10–1; and valve $T_1$ is open. The liquid descends in gauge M and refills the carburetor. One can thus measure the volume of gasoline or other liquid necessary to the closing of the needle valve; and by comparison, given the manufacturer's standards, the level of vacuum, and one can determine the point at which the closure needle W acts.

6. Consumption Measurement

The manufacturer provides technical specifications for the different consumptions, for example of the idling jets, or the consumptions under different conditions of operation.

The tests are effectuated preferably using the auxiliary reservoir $A_1$. This permits not using the pump if the pump is defective and so no disassembly of any part is necessary.

To this end, the valve G is open, and valve $G_1$ opens the circuit 20–17. To measure the consumption of the carburetor or the simultaneous consumption of the carburetors, the valve $I_3$ is closed, valves $I_1$, $T_1$ and $I_2$, $T_2$ being open. Consumption can be read directly on the flowmeters R–Q and $R_1$–$Q_1$. The feed flows of the carburetor chamber are not ordinarily constant. In order to provide direct reading of the flowmeters, it is desirable to dampen the oscillations thereof; and to this end, there is disposed above the flowmeter a reservoir P or $P_1$ containing an air cushion, as well as adjacent the valve $I_2$ or $I_1$ a metal ball $O_2$ or $O_3$ of which the loss of charge is a function of the weight or the section of the seat of O or $O_1$, thereby to regulate flow variations.

It should be noted that each time that the carburetor or carburetors are fed by the feed pump and the valve $G_1$ opens the circuit 22–17, this valve being coupled with G closes the valve G, the pneumo valve B opens the circuit 27–7 and the liquid in the discharge reservoir A falls by gravity to the auxiliary reservoir $A_1$ for reuse.

Of course, the apparatus according to the invention, with its variable pressure auxiliary reserve, permits effecting all types of measures of consumption or standardization other than on motors or heaters for combustible liquids, for example standardization of feed streams.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for monitoring and regulating carburetors and other gasoline consumption devices, comprising a first conduit, means for feeding test liquid under pressure from a source of liquid to said first conduit, a flowmeter, an auxiliary reservoir for said liquid, a first valve in said first conduit, conduit means connecting said first valve to said auxiliary reservoir and to said flowmeter, said first valve selectively directing flow of said liquid through said conduit means either directly from said source of liquid to said flowmeter or from said auxiliary reservoir to said flowmeter, a float valve in said auxiliary reservoir for arresting the flow of liquid from said first conduit to said auxiliary reservoir when said auxiliary reservoir is full of said liquid, a check valve in said conduit means for preventing the flow of said liquid from said auxiliary reservoir back to said first conduit, a second conduit for air under pressure, a pressure regulator in said second conduit, a second valve in said second conduit coupled to said first valve and so arranged that said second valve is open when said first valve is in the position in which the flowmeter is fed from the auxiliary reservoir and is closed when said first valve is in a position that the flowmeter is fed directly from said source of fluid under pressure, said second conduit supplying air under pressure to said auxiliary reservoir, a vertical graduated gauge whose lower part is in fluid communication with a carburetor to be tested and whose upper part is connected to the lower part of the auxiliary reservoir and to said pressure regulator, a third valve between the upper end of the gauge and the pressure regulator whereby when the third valve is open, air under pressure forces liquid in the gauge toward the bottom of the gauge and when the tird valve is closed, liquid under pressure can flow into the gauge, and a calibrated overflow conduit for said gauge for maintaining said gauge under pressure.

2. Apparatus as claimed in claim 1, and a discharge reservoir into which said calibrated overflow conduit discharges liquid from said gauge, a discharge conduit for passing liquid from said discharge reservoir to said auxiliary reservoir, and a pneumo valve under control of said air under pressure for closing communication between said reservoirs when said second valve is open.

3. Apparatus as claimed in claim 1, for use with plural carburetors, and branch conduit means from the lower end of said gauge to each of said carburetors.

4. Apparatus as claimed in claim 1, and a branch conduit in parallel to said first conduit and communicating with said first conduit upstream of said first valve, said branch conduit emptying into the upper portion of said auxiliary reservoir and having an anti-return valve to prevent backflow of excess pressure through said first conduit.

5. Apparatus as claimed in claim 4, in which said anti-return valve includes a ball having the same density as said liquid thereby to open under a very small pressure differential.

6. Apparatus as claimed in claim 1, and an air cushion communicating with the discharge end of said flowmeter, a further valve communicating with the discharge end of said flowmeter downstream from said air cushion, and a ballcheck valve downstream of said further valve so as to damp variations in fluid flow from said flowmeter.

* * * * *